US008036422B2

(12) United States Patent
Spitzig et al.

(10) Patent No.: US 8,036,422 B2
(45) Date of Patent: Oct. 11, 2011

(54) VERIFICATION SYSTEM AND METHOD IN A DOCUMENT PROCESSING ENVIRONMENT

(75) Inventors: Roger Spitzig, St. Clements (CA); Bob Richards, Kitchener (CA); Michael Boston, Kitchener (CA); David Rawlings, Kitchener (CA)

(73) Assignee: Bell and Howell, LLC, Durham, NC (US)

( * ) Notice: Subject to any disclaimer, the term of this patent is extended or adjusted under 35 U.S.C. 154(b) by 0 days.

(21) Appl. No.: 12/985,670

(22) Filed: Jan. 6, 2011

(65) Prior Publication Data

US 2011/0098847 A1 Apr. 28, 2011

Related U.S. Application Data

(62) Division of application No. 12/861,257, filed on Aug. 23, 2010, now abandoned, which is a division of application No. 10/928,704, filed on Aug. 30, 2004, now Pat. No. 7,804,979.

(30) Foreign Application Priority Data

Aug. 29, 2003 (CA) ..................................... 2438951

(51) Int. Cl.
*G06K 9/00* (2006.01)
(52) U.S. Cl. ........................................ 382/101; 707/705
(58) Field of Classification Search .................... 382/101
See application file for complete search history.

(56) References Cited

U.S. PATENT DOCUMENTS

| | | | | |
|---|---|---|---|---|
| 3,699,336 A * | 10/1972 | Ehrlich et al. | ............. | 250/461.2 |
| 3,878,509 A * | 4/1975 | Kikuchi et al. | ............... | 382/223 |
| 4,013,999 A * | 3/1977 | Erwin et al. | .................. | 382/101 |
| 4,514,816 A * | 4/1985 | Ollus et al. | ..................... | 700/223 |
| 4,825,058 A | 4/1989 | Poland | | |
| 5,031,223 A * | 7/1991 | Rosenbaum et al. | ......... | 382/101 |
| 5,033,725 A * | 7/1991 | van Duursen | .............. | 270/52.02 |
| 5,067,088 A * | 11/1991 | Schneiderhan | ............... | 700/221 |
| 5,307,423 A * | 4/1994 | Gupta et al. | .................. | 382/182 |
| 5,317,646 A * | 5/1994 | Sang et al. | ..................... | 382/175 |
| 5,317,654 A * | 5/1994 | Perry et al. | .................... | 382/101 |
| 5,401,949 A | 3/1995 | Ziemacki et al. | | |
| 5,406,384 A * | 4/1995 | Sakuragi | ....................... | 358/403 |
| 5,434,629 A * | 7/1995 | Pearson et al. | ................ | 348/721 |
| 5,440,648 A * | 8/1995 | Roberts et al. | ................ | 382/141 |

(Continued)

FOREIGN PATENT DOCUMENTS

WO WO 02/00362 A2 1/2002

(Continued)

OTHER PUBLICATIONS

European Search Report issued in European Patent Application No. EP 04761702.2-1229/1661065 PCT/CA2004001538, dated Aug. 27, 2008.

(Continued)

*Primary Examiner* — Sath V Perungavoor
(74) *Attorney, Agent, or Firm* — McDermott Will & Emery LLP

(57) ABSTRACT

A feeder control system and method are disclosed. The system includes a feeder information detector, and a feeder information leverager to provide integrity verification, system control and/or reporting. The method includes the steps of detecting feeder information, and leveraging the feeder information to provide integrity verification, system control and/or reporting.

4 Claims, 5 Drawing Sheets

U.S. PATENT DOCUMENTS

| | | | |
|---|---|---|---|
| 5,546,577 A * | 8/1996 | Marlin et al. ......................... 1/1 |
| 5,696,591 A * | 12/1997 | Bilhorn et al. ................. 356/429 |
| 5,698,833 A * | 12/1997 | Skinger ..................... 235/462.09 |
| 5,745,590 A * | 4/1998 | Pollard .......................... 382/101 |
| 5,897,733 A * | 4/1999 | Stevens ......................... 156/227 |
| 5,969,326 A | 10/1999 | Ogami et al. |
| 6,041,374 A * | 3/2000 | Postman et al. ................. 710/73 |
| 6,079,705 A | 6/2000 | Skvoretz et al. |
| 6,095,418 A * | 8/2000 | Swartz et al. ............ 235/462.01 |
| 6,098,892 A * | 8/2000 | Peoples, Jr. ..................... 235/494 |
| 6,119,051 A | 9/2000 | Anderson, Jr. et al. |
| 6,260,761 B1 * | 7/2001 | Peoples, Jr. ............. 235/462.07 |
| 6,370,521 B1 | 4/2002 | Pigos, Jr. et al. |
| 6,398,105 B2 | 6/2002 | Ramberg et al. |
| 6,484,066 B1 * | 11/2002 | Riess et al. ..................... 700/217 |
| 6,505,778 B1 | 1/2003 | Reddersen et al. |
| 6,508,365 B1 * | 1/2003 | Cacace-Bailey et al. ..... 209/584 |
| 6,557,000 B1 * | 4/2003 | Seestrom et al. ............. 707/752 |
| 6,557,755 B1 * | 5/2003 | Pickering et al. ............. 235/376 |
| 6,585,159 B1 | 7/2003 | Meier et al. |
| 6,614,916 B2 | 9/2003 | MacDonald |
| 6,708,884 B1 * | 3/2004 | Su et al. ................... 235/462.09 |
| 6,711,283 B1 * | 3/2004 | Soenksen ...................... 382/133 |
| 6,725,429 B1 * | 4/2004 | Gardner et al. ............... 715/234 |
| 6,729,544 B2 * | 5/2004 | Navon ..................... 235/462.14 |
| 6,738,496 B1 * | 5/2004 | Van Hall ....................... 382/101 |
| 6,739,510 B2 * | 5/2004 | Fitzgibbons et al. .... 235/462.01 |
| 6,750,466 B2 * | 6/2004 | Guha et al. ............... 250/559.46 |
| 6,757,428 B1 * | 6/2004 | Lin et al. ....................... 382/165 |
| 6,778,683 B1 * | 8/2004 | Bonner et al. ................ 382/101 |
| 6,791,050 B2 | 9/2004 | Daniels, Jr. et al. |
| 6,901,412 B2 * | 5/2005 | Pigos et al. ......................... 1/1 |
| 6,917,696 B2 * | 7/2005 | Soenksen ...................... 382/128 |
| 6,944,331 B2 * | 9/2005 | Schmidt et al. ............... 382/165 |
| 6,970,182 B1 * | 11/2005 | Schultz et al. .................. 348/86 |
| 7,051,007 B2 * | 5/2006 | Moore et al. .................. 705/408 |
| 7,123,376 B2 * | 10/2006 | Shea ............................ 358/1.15 |
| 7,355,743 B2 * | 4/2008 | McManus et al. ........... 358/1.18 |
| 7,457,446 B2 * | 11/2008 | Soenksen ...................... 382/128 |
| 7,567,941 B2 * | 7/2009 | Sagi et al. ..................... 705/404 |
| 7,636,449 B2 * | 12/2009 | Mirtich et al. ................ 382/100 |
| 7,777,905 B2 * | 8/2010 | Liu .............................. 358/1.15 |
| 2002/0109112 A1 * | 8/2002 | Guha et al. ............... 250/559.46 |
| 2002/0162889 A1 * | 11/2002 | Navon ..................... 235/462.14 |
| 2003/0109954 A1 * | 6/2003 | Daniels et al. ................ 700/226 |
| 2003/0125835 A1 * | 7/2003 | William et al. ............... 700/223 |
| 2003/0196175 A1 * | 10/2003 | Shea ............................ 715/526 |
| 2004/0025319 A1 | 2/2004 | Murphy |
| 2004/0125406 A1 * | 7/2004 | McManus et al. ........... 358/1.18 |
| 2004/0264739 A1 * | 12/2004 | Das et al. ....................... 382/101 |
| 2005/0031162 A1 * | 2/2005 | Sagi et al. ..................... 382/101 |
| 2005/0149225 A1 * | 7/2005 | Spitzig et al. ................. 700/213 |
| 2005/0270638 A1 * | 12/2005 | Soenksen ..................... 359/368 |
| 2007/0171448 A1 * | 7/2007 | Liu .............................. 358/1.13 |
| 2010/0315692 A1 * | 12/2010 | Spitzig et al. ................. 358/498 |
| 2011/0098847 A1 * | 4/2011 | Spitzig et al. ................. 700/226 |

FOREIGN PATENT DOCUMENTS

| | | |
|---|---|---|
| WO | WO 03/045588 A2 | 6/2003 |
| WO | WO 2005/022448 A1 | 3/2005 |

OTHER PUBLICATIONS

International Search Report dated Jan. 20, 2005, issued in International Application No. PCT/CA2004/001538.

PCT Notification Concerning Transmittal of International Preliminary Report on Patentability dated Mar. 9, 2006, issued in International Application No. PCT/CA2004/001538.

European Office Action issued in European Patent Application No. EP 04 761 702 dated Mar. 9, 2009.

Entire Prosecution of U.S. Appl. No. 12/861,257 to Spitzig, et al., filed Aug. 23, 2010, entitled "Verification System and Method in a Document Processing Environment".

Entire Prosecution of U.S. Appl. No. 10/928,704 to Spitzig, et al., filed Aug. 20, 2004, entitled "Verification System and Method in a Document Processing Environment".

United States Notice of Allowance issued in U.S. Appl. No. 13/080,198 dated Jun. 6, 2011.

* cited by examiner

VERIFICATION SYSTEM AND METHOD IN A DOCUMENT PROCESSING ENVIRONMENT

This application is a Divisional of U.S. application Ser. No. 12/861,257, filed on Aug. 23, 2010 now abandoned, which is a Divisional of U.S. application Ser. No. 10/928,704, filed on Aug. 30, 2004, now U.S. Pat. No. 7,804,979, which in turn claims the benefit of Canada Application No. 2,438,951, the disclosures of which Applications are incorporated by reference herein.

FIELD

The present teachings relate generally to document handling equipment, and more particularly to control and reporting systems, and integrity verification techniques for feeder equipment such as mail inserters, printing presses, and bookmakers.

BACKGROUND

While mail systems have always strived for accuracy and integrity to ensure that letters arrive at their proper destination in good order and in a timely manner, integrity verification is of paramount importance in the industry today. Issues such as inspecting sequential page numbering, inspecting correct postage, and ensuring contents to wrapper matching now need to be performed in a highly accurate and efficient manner.

Early prior art methods of managing the integrity of a large volume mailing typically required the use of legions of employees manually verifying the accuracy of work pieces before they were sent out. While these methods were adequate for their time, contemporary requirements for enormous and time-critical mailings have led to the development of high-speed feeder systems with a capacity to handle enormous quantities of output. These high capacity feeders now require only a minimum of human involvement, leaving those early quality control methods inherently obsolescent.

Attempts at integrity verification for contemporary feeder systems have involved the placement of marks directly upon the work piece that encode basic information about the work piece that can be read by a somewhat rudimentary machine vision system to glean information about the status of the process. One such mark is the Optical Mark Recognition (OMR). OMR marks can be read by a light probe to gain information about a particular work piece for use in integrity verification such as sequential numbering or ensuring all pages are collated together into a single mailing. The problem with the OMR technique is that it provides only limited information and requires the disfigurement of the work piece itself for the sole purpose of integrity verification, a process which when completed leaves the markings remaining permanently on the work piece. This is undesirable in the industry, which would prefer that only information pertaining to the document's original purpose be present upon receipt by the recipient.

Later developments use the now ubiquitous bar-coding method. While providing more detailed information that can be useful in integrity verification techniques, as with OMR this too disfigures the work piece for peripheral purposes, and provides the additional disadvantage of tending to make the recipient feel like "just a number".

More recent techniques have involved the use of area-scanning cameras that capture images in a manner not unlike a common consumer digital camera. These cameras are used to scan an area of a document, with Optical Character Recognition (OCR) techniques subsequently performed to glean information from the scanned region of the work piece. This provides the advantage of limiting the disfigurement of the work piece by attempting to use existing information such as the address label to verify the accuracy of the mail out. The problem with this technique is that area-scanning cameras are incapable of scanning a large area image in a rapid manner, and require waiting for the entire area to be scanned before the image can be processed for information.

A further problem in the field is with the capturing of embossed or three dimensional characters on a work piece, such as a credit card. Imaging or reading the embossed characters has proved to be inherently difficult. Since feeder systems are frequently employed to mail out new and renewed credit cards, a need exists to capture the printed information on those cards to ensure the integrity of the mail out. Prior art systems will typically employ a ring light, also used with other applications, to properly illuminate the characters for improved contrast. However, if the ring light is not precisely positioned directly on top of the target, which occurs with regularity, a reader will be unable to properly capture the information due to shadowing and other problems.

One method around this problem has been to try to read matching information on a magnetic stripe that often accompanies these cards. However, not all cards include such a stripe, and even when these stripes are present, they are difficult to read and require a purpose use reader. What is needed is an improved method of reading three-dimensional characters in a feeder system.

A further problem in the field is with the utilization of existing or legacy resources in a cost-effective manner. When new symbology techniques are implemented, while offering desirable improvements, they typically require the purchase of new readers to implement the new symbology. It can become exceedingly expensive to purchase a new reader for use with only minimal job runs using the new symbology, leaving the dilemma of whether to make the purchase or to wait. What is needed is a way to minimize the requirement to purchase new equipment each time a new symbology is utilized, and instead leverage existing legacy equipment to take advantage of any newly developed symbologies.

A further problem in the field is that prior art systems have generally required the use of multiple area-scanning cameras, one for each area targeted for an expected piece of information, such as an address or page number. These prior art methods have required the accurate positioning of a camera in the feeder, and accurate pre-printing of the information in a narrow area for each document in order to ensure its respective camera will image it. With the use of so many cameras, available good locations to mount them quickly become scarce, and the costs increase in proportion to the amount of required cameras. What is needed is a way to reduce the amount of cameras required.

A further problem in the field is that the target area for an area-scan camera is lit by a point source. Since the light needs to be close to the paper for adequate illumination, a 'hot-spot' is created on the image that is considerably lighter at the center and falls off towards the edges. There is no single threshold value that works across the entire image when reading scanned images. What is needed is a better way to read information through these difficult lighting conditions.

A further problem in the field is an inability to decode checks in a rapid manner in order to provide timely feedback to the feeder. The prior art approach has been to batch up all the images and decode them later, which proves to be too late for real-time control. What is needed is a way to rapidly decode checks in order to provide real-time feedback to the feeder.

For the foregoing reasons, there is a need for an improved feeder system and method.

SUMMARY

The present teachings are directed to a feeder control system and method. The system includes a feeder information detector, and a feeder information leverager to provide integrity verification, system control and/or reporting.

The method includes the steps of detecting feeder information, and leveraging the feeder information to provide integrity verification, system control and/or reporting.

The system is highly interoperable with multiple machine manufactures and new or legacy equipment, adding improved quality control and integrity checking to print and mail operations. The system enables operators to run their inserters and other feeder equipment at full speed. The system enables cross-referencing to a master list to ensure that what is thought to have been printed and packaged is what was actually done.

A quality assurance report can be printed at any time that identifies every envelope the system has seen, and often more importantly every envelope it hasn't seen. This eliminates any need to guess what needs to be reprinted, therein providing a higher quality output at a lower cost, whether matching on an inserter or checking text on a web press. The system is ultimately more tolerant of poor setup, easier to use, requires less operator training to get good results, dramatically improves accuracy, and requires fewer service calls.

Other aspects and features of the present teachings will become apparent to those ordinarily skilled in the art upon review of the following description of specific embodiments in conjunction with the accompanying figures.

BRIEF DESCRIPTION OF THE DRAWINGS

These and other features, aspects, and advantages of the present teachings will become better understood with regard to the following description, appended claims, and accompanying drawings where:

DETAILED DESCRIPTION OF THE PRESENTLY PREFERRED EMBODIMENT

Figure 1:
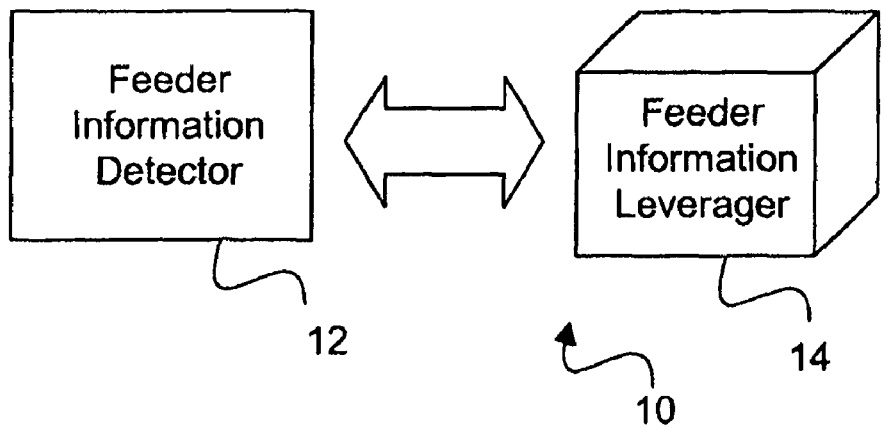
FIG. 1 illustrates a feeder control system in accordance with an embodiment.

Examples of the present teachings include a feeder control system 10 and method 100. As illustrated in FIG. 1, the system 10 includes a feeder information detector 12, and a feeder information leverager 14 to provide integrity verification, system control and/or reporting.

Figure 2:
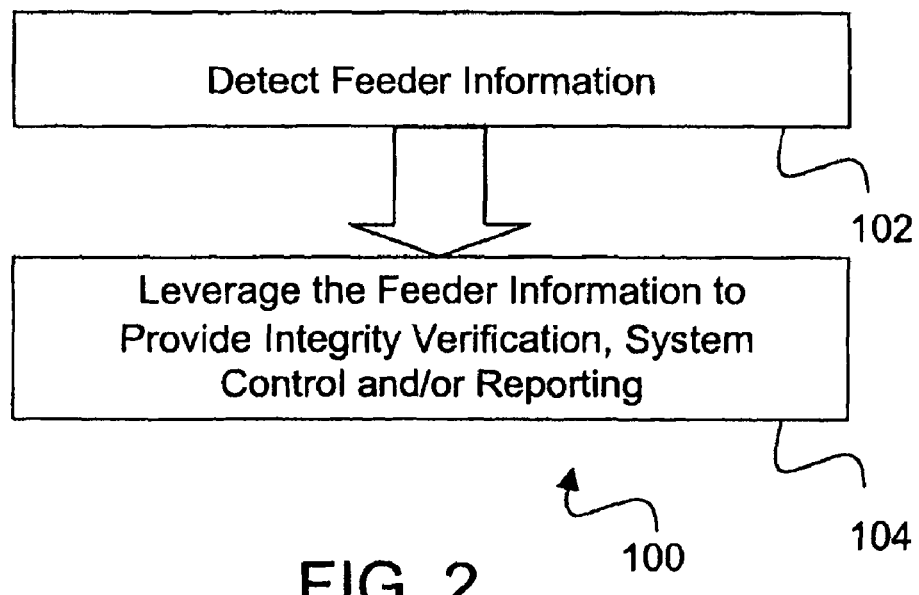
FIG. 2 illustrates a feeder control method in accordance with an embodiment.

As illustrated in FIG. 2, the method 100 includes the steps of detecting feeder information 102, and leveraging the feeder information to provide integrity verification, system control and/or reporting 104.

Figure 3:
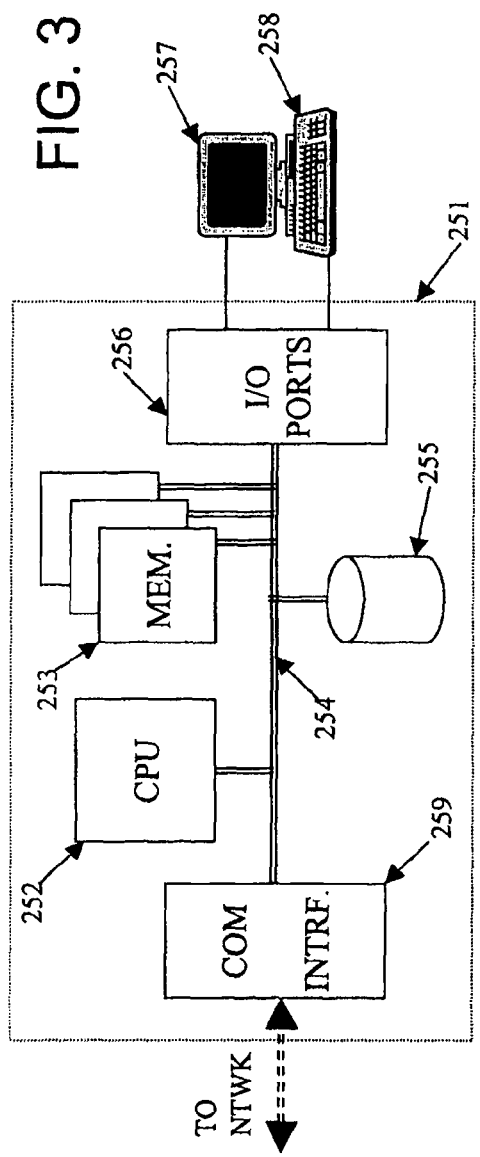
FIG. 3 is a simplified block diagram of a general-purpose computer.

FIG. 3 is a functional block diagram of a PC or workstation type implementation of a system 251, which may serve as an operator interface or other element for the system 10 and/or method 100.

The exemplary computer system 251 contains a central processing unit (CPU) 252, memories 253 and an interconnect bus 254. The CPU 252 may contain a single microprocessor, or may contain a plurality of microprocessors for configuring the computer system 252 as a multi-processor system. The memories 253 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 252.

The mass storage may include one or more magnetic disk or tape drives or optical disk drives, for storing data and instructions for use by CPU 252: For a home PC, for example, at least one mass storage system 255 in the form of a disk drive or tape drive, stores the operating system and application software as well as data, including received messages and documents. The mass storage 255 within the computer system 251 may also include one or more drives for various portable media, such as a floppy disk, a compact disc read only memory (CD-ROM), or an integrated circuit non-volatile memory adapter (i.e. PCMCIA adapter) to input and output data and code to and from the computer system 251.

The system 251 also includes one or more input/output interfaces for communications, shown by way of example as an interface 259 for data communications via a network. The interface 259 may be a modem, an Ethernet card or any other appropriate data communications device. The physical communication links may be optical, wired, or wireless (e.g., via satellite or cellular network).

The computer system 251 may further include appropriate input/output ports 256 for interconnection with a display 257 and a keyboard 258 serving as the respective user interface. For example, the computer may include a graphics subsystem to drive the output display 257. The output display 257 may include a cathode ray tube (CRT) display or liquid crystal display (LCD). Although not shown, the PC type system typically would include a port for connection to a printer. The input control devices for such an implementation of the system 251 would include the keyboard 258 for inputting alphanumeric and other key information. The input control devices for the system may further include a cursor control device (not shown), such as a mouse, a trackball, stylus, or cursor direction keys. The links of the peripherals 257, 258 to the system 251 may be wired connections or use wireless communications.

Each computer system 251 runs a variety of applications programs and stores data, enabling one or more interactions via a user interface, provided through elements such as 257 and 258, and/or over a network to implement desired processing.

Figure 4:
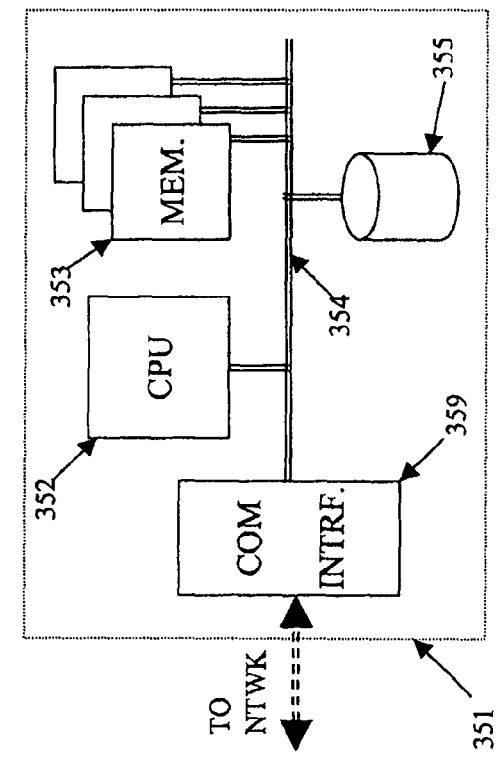
FIG. 4 is a simplified block diagram of a general-purpose computer.

FIG. 4 is a functional block diagram of a general-purpose computer system 351, which may perform the functions of an operator interface or other element of the system 10 and/or method 100. The exemplary computer system 351 contains a central processing unit (CPU) 352, memories 353 and an interconnect bus 354. The CPU 352 may contain a single microprocessor, or may contain a plurality of microprocessors for configuring the computer system 352 as a multi-processor system. The memories 353 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 352.

The mass storage may include one or more magnetic disk or tape drives or optical disk drives, for storing data and instructions for use by CPU 352. The mass storage 355 may also include one or more drives for various portable media, such as a floppy disk, a compact disc read only memory (CD-ROM), or an integrated circuit non-volatile memory adapter (i.e. PCMCIA adapter) to input and output data and code to and from the computer system 351.

The system 351 also includes one or more input/output interfaces for communications, shown by way of example as an interface 359 for data communications via a network. The interface 359 may be a modem, an Ethernet card or any other appropriate data communications device. The physical communication links may be optical, wired, or wireless (e.g., via satellite or cellular network). Alternatively, the computer system may comprise a mainframe or other type of host computer system capable of web-based communications via the Internet.

Although not shown, the system 351 may further include appropriate input/output ports for interconnection with a local display and a keyboard or the like serving as a local user interface for programming purposes. Alternatively, operations personnel may interact with the system 351 for control and programming of the system from remote terminal devices via the Internet or some other network link.

The components contained in the computer systems 251 and 351 are those typically found in general purpose computer systems used as servers, workstations, personal computers, network terminals, and the like. In fact, these components are intended to represent a broad category of such computer components that are well known in the art.

At different times all or portions of the executable code or database for any or all of the software elements may reside in physical media or be carried by electromagnetic media. Physical media include the memory of the computer processing systems 251, 351, such as various semiconductor memories, tape drives, disc drives and the like of general-purpose computer systems. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links.

Terms relating to computer or machine "readable medium" as used herein refer to any medium that participates in providing instructions to a processor for execution or for carrying data to or from a processor for storage or manipulation. Such a medium may take many forms, including but not limited to, non-volatile media, volatile media, and transmission media. Non-volatile media include, for example, optical or magnetic disks, such as in any of the storage devices in the system illustrated in FIG. 3. Volatile media include dynamic memory, such as main memory. Transmission media include coaxial cables; copper wire and fiber optics, including the wires that comprise a bus within a computer system. Transmission media can also take the form of electric or electromagnetic signals, or acoustic or light waves such as those generated during radio frequency (RF) and infrared (IR) data communications. Common forms of computer or machine readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, or any other medium from which a computer can read. Various forms of computer or machine-readable media may be involved in carrying one or more sequences of one or more instructions or data to a processor for execution.

The system 10 and method 100 generally include at least one of four core technologies including line-scan camera techniques, optical symbology recognition, Regions of Interest (ROI), and data indexing techniques.

A line-scan camera provides for the rapid scanning of a target area in small increments. This allows for processing to commence before all increments have been completed. Using this technology in combination with OCR techniques enables a feeder to perform with greatly improved efficiency. While the use of a line-scan camera is almost always preferable, the system 10 can be implemented using area scanning cameras or other vision techniques.

The system 10 can employ back end, front end, and other cameras within the feeder in a networked configuration for distributing the scanning and processing workload, as well as leverage the combined strength of the various remote information gathering locations.

Figure 5:
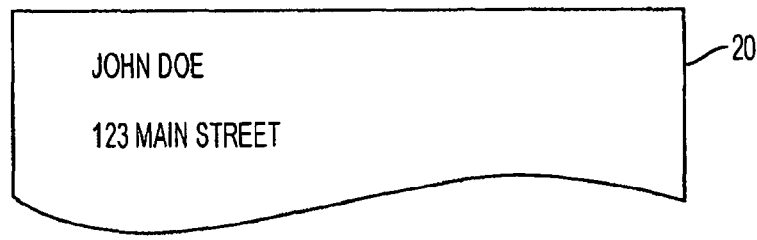
FIG. 5 illustrates simultaneous scan and decode.

The system 10 allows for the scanning of an image and the simultaneous decoding of it, decoding the first scanned line at the same time the second line is being scanned, and so on. As illustrated in FIG. 5, this process enables a work piece 20 to be moving and scanned for information processing simultaneously, allowing work pieces to continuously move in an uninterrupted manner along the raceway as it passes through the viewable window of a line-scan camera. This allows the process to maintain a quicker processing capability, without having to stop a feeder after an initial feed for the sole purpose of performing a stationary scan. Prior art methods maintain a "buffer zone" for providing a stopping point after an initial movement of the work piece out of the feeder that requires each work piece to stop at a pre-defined location for a static scan and the subsequent re-start of the document's journey. With the system's 10 processing technique, the buffer zone method is no longer required. This can result in significant savings from increased average raceway speed, and reduced required feeder real estate.

This technique can also be applied at a later point in the raceway where, by scanning quickly and processing simultaneously, timely diversions can be performed. To ensure enough time for diverting work pieces, prior art methods have employed lengthy raceways that increase the footprint in order to provide the proper time.

The system 10 also utilizes the placement of a line-scan camera with OCR techniques at the front end of the feeder system, which is highly advantageous for providing information early in the feeder system. The problem is that existing techniques, typically bar-coding or OMR techniques, are highly unreliable so that the information that is gleaned generally arrives too late in the raceway to be of any use in affecting the outcome of the process. Having a reliable and timely method is highly desirable since almost any error in a system is unacceptable.

Figure 6:
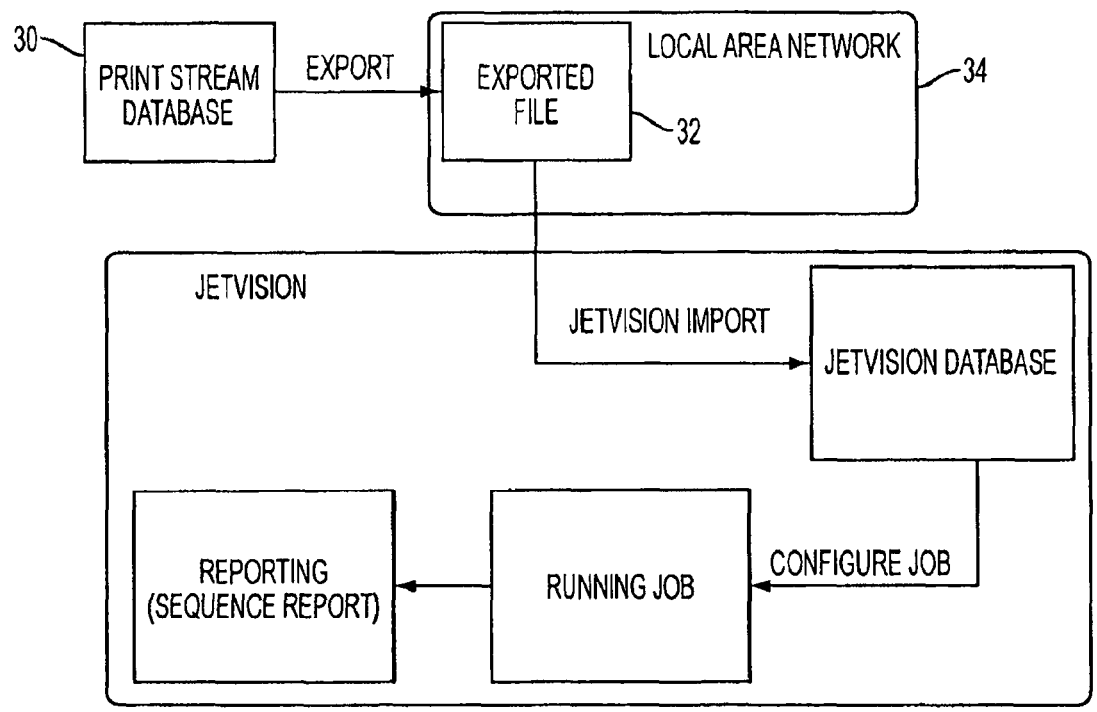
FIG. 6 illustrates print stream extraction.

Another technique enabled by the system 10 is that, by leveraging the data indexing techniques, the extraction of read comparison data from an extracted print stream 30 can provide data that can be indexed to assist in integrity verification methods to match previously extracted data with what ends up within the feeder system in line with the pre-created print stream 30. As illustrated in FIG. 6, the system 10 intercedes upon the provided print stream 30 to extract highly useful data that can be utilized in fuzzy logic processing among others that can be useful in integrity practices. Data from a print stream 30 is extracted to a data file 32 at a networked location 34, imported into the system 10, configured, run, and ultimately accessible through web-based reports for detailed piece information and reconciliation. The data can be exported and saved for later import and use in subsequent data indexing jobs. The system 10 import tools will pull the specified fields from the file, and insert them into a data file. Once the job has been set up, the system 10 will be able to read and match addresses to the data file. If pieces go out of order or the system 10 encounters a misread, the machine will stop and prompt for appropriate action.

Another technique enabled by the system 10 is a read-anchoring search technique. This technique uses a fixed element in an image as an "anchor" point to locate a variable portion. For example, if it is known that wherever the term "account #" is the account number will follow, one can quickly focus the search to find the number. The term "account #" can therefore form an anchor for determining where to look for needed information to speed up the processing. In addition, if one knows that "page two" always contains the anchor term one can quickly arrive at the location of the needed information within a multi-page document. This text anchoring technique can also act as an enabler for many other features such as page set verification.

The system 10 further provides specific techniques to improve reading of text and other text-based markings where difficulties arise from issues such as skewing and uneven lighting.

A technique enabled by the system 10 is the pre-processing of scanned images such as automatic light adjustment via software such as brightness flattening. Light is often uneven across a document due to issues such as poorly trained operators, difficult camera location, inconsistent paper feed, or wrinkled paper. The system 10 uses 'gradient' software to change the relative intensity of reflecting light to balance the intensity of the field of view. Prior art methods use mechanical or other analog solutions such as "light maneuvering" techniques. The use of "thresholding" techniques and a plurality of filtering and correction techniques are available within the system 10 for the known difficulties of extracting data from a scanned image such as skewing, black on black printing, watermarks, "write-overs", and fingerprinting.

Another system 10 technique is to line-scan Magnetic Ink Character Recognition (MICR) to de-skew a skewed image. MICR is typically used for returned check processing. Some checks have complex images in the background. Signatures and handwriting can be confused for portions of the MICR line. The system 10 is capable of distinguishing.

The system 10 is able to accurately read three-dimensional characters utilizing the imaging of the peaks of characters by understanding how light falls upon a raised surface. This is primarily used for the reading of embossed credit card account numbers for integrity checking purposes. The sensed lighter areas of the scanned characters provide highly accurate character recognition through processing of the raw image since light will fall on the peaks of the characters more brilliantly than the lower "valley" areas. These peak areas are also the desired locations of the most accurate representation of the characters themselves. The height of an embossed character is determined by a light-leveled three-dimensional scan where light gradients aid in determining the peaks, and an algorithm then converts it to a "flattened" 2-D embodiment.

Since a good way to test a system's integrity is to detect if the "logo-ed" letterhead, envelope or other work piece contains, or is printed with the appropriate material that is scheduled to be used. Another technique enabled by the system's technology is logo or other image matching. The system 10 can use the aforementioned data indexing techniques in conjunction with the further aforementioned ROI techniques to determine through processing whether the system 10 is running properly by comparing a scanned image of what should have a logo present with what is being inserted or printed upon that specific workpiece.

Figure 7:
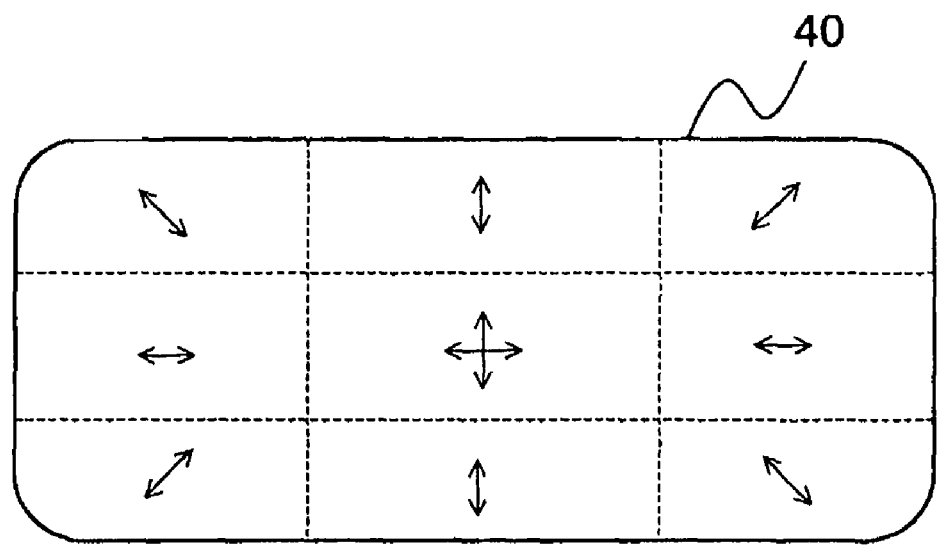
FIG. 7 illustrates a control grid.

The system 10 provides for the reading of multiple regions from a single image simultaneously instead of the less desirable existing method of using multiple area-scan cameras to capture multiple images. Utilizing Regions of Interest (ROI), the system 10 can enable the assignment by an operator of ROI's that provide for a search region so that the system 10 can perform a targeted search for expected data zones. The system 10 provides for the use of a single line-scan camera to scan an entire document from a single location, with subsequent processing performed on pre-determined software ROI. FIG. 7 illustrates an exemplary example of a control grid 40 advantageously employed for selecting a region of interest in the field of view. These regions can then be saved, along with other design functionalities, as a template for subsequent reuse.

The control grid 40 is included within the user interface to create an ROI, determine its size and location, resize or relocate that region and attribute parameters to that ROI such as what optical scanning method will be implemented, and/or what character processing should be employed.

The system 10 further provides for the provision of address masking locators. Knowing the general shape that an address takes and masking suspect areas in the form of a "Blob", the location of an address can be searched. Then by using filtering techniques the address can be found in an image of a letter that contains several targeted areas of information. When using "blobs" to mask an address location, areas are masked by blabbed areas, filters are applied, and the last blob remaining after the filters are applied that resembles the predetermined silhouette provides an extremely high probability of the correct location of the address for further processing via OCR techniques to capture data. This can provide important assurances of proper addressing, and therefore, for example, avoid violations of United States Postal Service (USPS) standards.

The system 10 further provides for indicia verification techniques. With the use of efficient image processing algorithms, the system 10 can scan an ROI target area to confirm the presence of an expected indicator. For example, algorithms can determine the presence or absence of an appropriate postal meter stamp with a minimum of processing by focusing on a predetermined set of search areas and, by using thresholding techniques, determine a positive or negative verification. This provides for the assurance, among other things, that proper postage was utilized.

The system 10 provides for the archiving of a setup as a template. With the high flexibility of the system 10, ROI's and other functionality implemented within a particular job run can be saved as a template for reuse at a later time either as is or with minor changes, therein saving time and money by avoiding duplication of work. The template is saved with all customizable attributes recorded for later retrieval. Using the system 10 in such a manner, a job having a first ROI set for an integrity check of a logo, a second ROI set for a three-dimensional read of embossed characters, and a third ROI providing a barcode scan, can all be saved as a template. The template can then be subsequently referenced through for example the scanning of a barcode printed on a provided work sheet commonly used in the industry, thereby increasing job efficiency.

The system 10 also provides for image archiving of scanned images. This enables the scanning and storage of an entire document and entire runs in a streamlined image format. The stored image can be subsequently retrieved for desired verification requirements such as confirmation of mail out in a dispute resolution issue.

The system 10 further enables the creation of a region, and subsequent selection of symbology. Once the region has been determined, the particular symbology expected to be present can be selected through this interface. The system 10 further allows for the selection of an integrity test to perform. The region can be further associated with an integrity test to be performed, such as using data indexing techniques to determine correct pairing of a wrapper with its insert.

A single user interface is provided for machine control and a camera inspection system. The user interface includes components such as the control grid 40, draw on action and highlighting that enable control of feeder devices and the camera inspection system through a single user interface. By networking multiple feeder stations with access through a central GUI, operational effectiveness and quality control is improved.

The system 10 further provides a web browser to access "on-board reporting". The system interface can include an embedded web browser for providing displayed system 10 status reports and for initiating printouts. The web browser is advantageously located on the same computer station as the real time feeder machine control system process, but in a separate memory area and at a lower priority for system resources. This provides highly accurate and up to date system status reports, while providing the machine control process with the highest priority access to system resources.

The system 10 further provides for "closed-loop" integrity checking using multiple networked line-scan cameras and other devices employed to leverage information gathered from multiple locations throughout the feeder process at a central location to act as a multiplier.

Operations or applications of the system 10 provide for data indexing techniques for uses such as matching "John Doe" to "Dear John" captured data by using hashing to perform 'fuzzy' matching. The system 10 can then provide an advanced methodology of data driven inserting (DDI) to more efficiently run an inserter or drive another feeder device such as a printer. It should be noted that matching "Dear John" to "John Doe" could be performed for matching purposes independent of DDI. For example, the feeder device might not be manipulated as a result of the test, but rather simply to confirm that the pieces are being correctly matched and to report the result.

The use of data indexing techniques can provide significant cost savings by ensuring the integrity of a job, and can further provide information that can be used to reduce the costs of a mail out through reduced postal rates and the like as would be known to those of skill in the art. Uses include print quality assurance, collating and sequence verification, insert matching, selective inserting, printer control, audit trails, and postal separation.

The system 10 is further capable of performing 'parallel decoding'. The system 10 can read checks at a very high speed, as much as 40+ per second, and decode them in parallel. Although the checks may all be fed and imaged much sooner than the system 10 decoding completes, as long as decoding completes before the machine is ready to cycle on to the next batch of checks, no real-time delay in the system occurs. The system 10 uses a combination of imaging in real time and parallel decoding, which while not completing before the images are all taken, does complete before it is too late to give the feeder device timely feedback.

Figure 8:
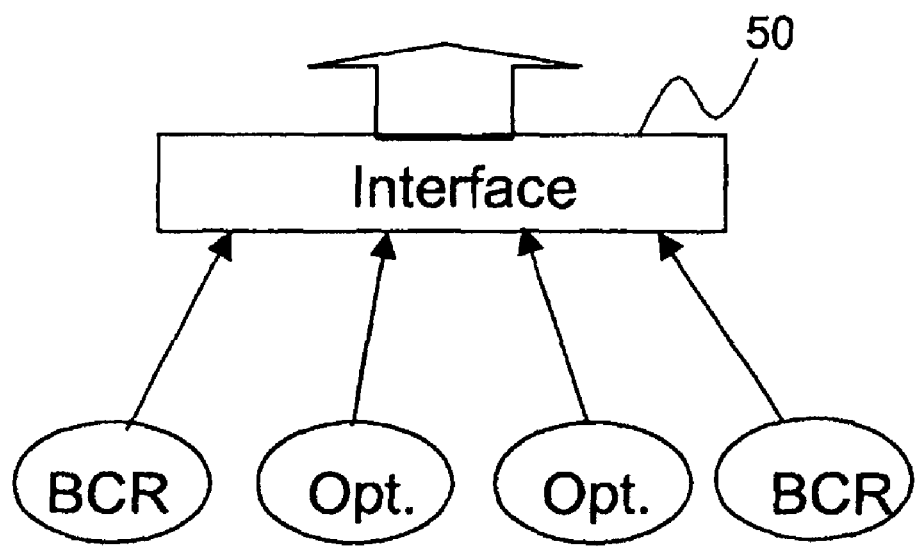
FIG. 8 illustrates a one-to-many reader.

The system 10 utilizes a single interface 50 to recognize many differing symbologies including MICR, text, barcode, or OMR. This method enables a "one reader to many symbologies" capability, as illustrated in FIG. 8.

The system 10 enables the reading of OCR, BAR, and OMR (Optical Mark Recognition) codes using only a line-scan camera instead of prior art methods of using matching readers for each code to be read. The system 10 reads OCR, BAR, and/or OMR characters using a line-scan camera, translates the code to a single common code for a single existing reader such as a barcode reader, and then spoofs that one reader into thinking it read the code off of the piece itself. This eliminates the need to provide matching readers for each code type.

Figure 9:
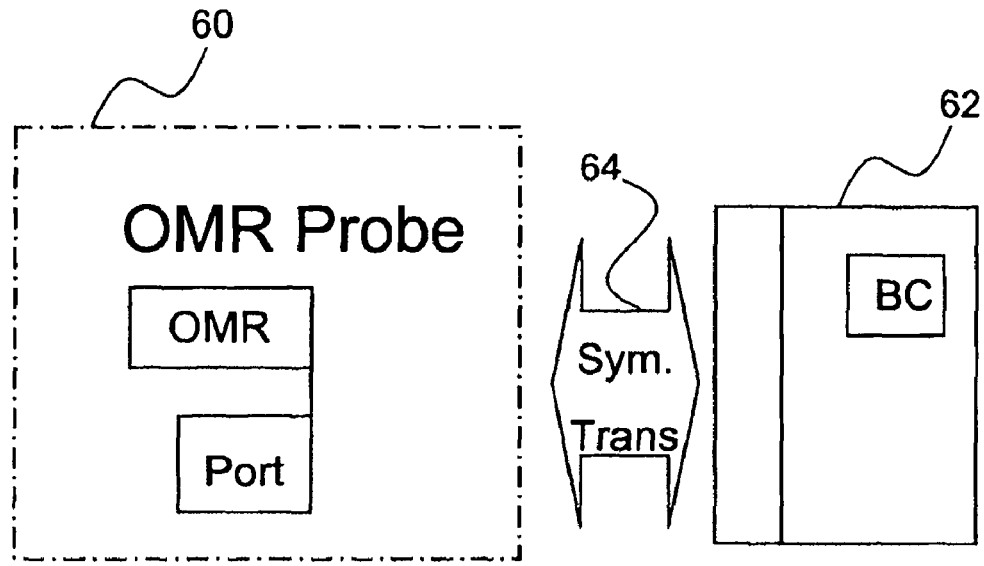
FIG. 9 illustrates a symbology translator.
Figure 10:
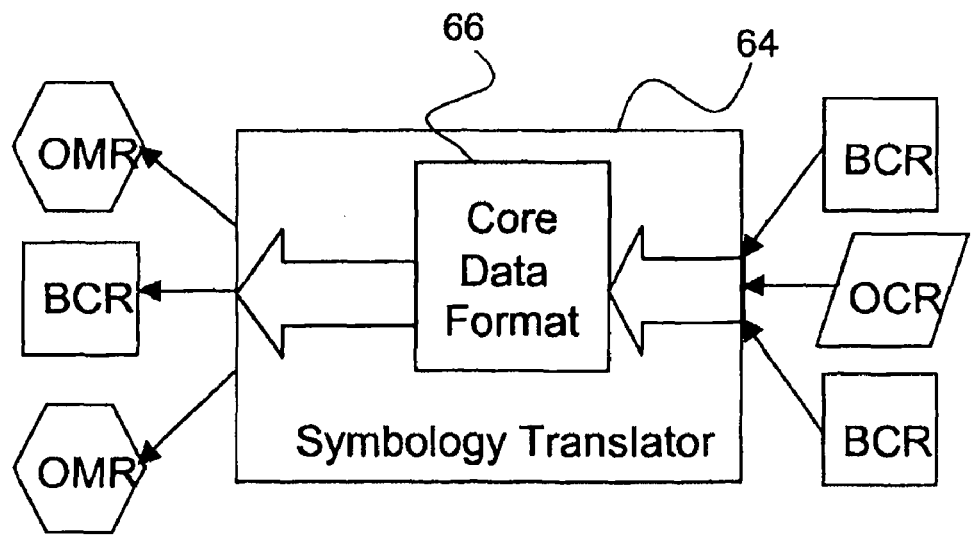
FIG. 10 illustrates a core data format symbology translation.

As illustrated in FIG. 9, the system 10 provides for symbology translation whereby OCR 60 can be read through the aforementioned line-scanning techniques, and delivered serially via a bar code reader (BCR) 62 or other legacy reader input port. In other words, one can read symbology A and output symbology B, and vice versa by simulating a legacy input to control an antiquated system utilizing a spoofing technique. By line-scanning a symbology, the system 10 enables the translation of that symbology to another symbology that has a read capability present within the existing or legacy devices. In this manner, one can input one data format into the symbology translator 64 and output a different data format that has an existing reader input device or port so as to leverage existing equipment, saving the expense of having to purchase a new symbology-specific reader. As illustrated in FIG. 10, the symbology translator 64 uses a core data format 66 to act as a conversion interface between the source symbology and the target symbology.

By utilizing a high-speed probability algorithm in combination with a data file, the system 10 can read multiple printed information elements on work pieces to be assembled. This ensures that integrity decisions can be made at high-speed so that they can be completed before a subsequent operation executes, such as in the assembly of a work piece.

Line-scan cameras can be placed at the back end of a feeder device, on an Automated Inline Mailer (AIM) feeder used to hold or fold work pieces so that the integrity of what is being mailed is verified before it is too late for corrective action to take place. These line-scan cameras can also be utilized on a stream feeder, in the feed station itself, as well as scanning during feeding. When a line-scan camera is placed on or about the printer area, the system 10 can check for among other things print quality, or for the presence of double printing. By placing a line-scan camera on or about the postal meter stamping area, verification of proper metering such as missed stamping, double stamping, and illegible stamping can be undertaken.

Since all parts of a feeder system can be monitored, the system 10 is capable of verifying the integrity of every printed piece of mail in even the largest of mailings or printings. This can ensure that each and every document printed is mailed only once. Cameras can be moved where they are most needed. The system 10 will read what an operator wants to read, providing high flexibility. The system 10 can watch for missing envelopes, disoriented inserts, duplicate pieces, and poor print quality. The system 10 can track production quality at speeds that more closely mirror those of equipment maximums. The system 10 is highly flexible enabling the reading of multiple differing fonts, languages and codes including OCR, OMR, bar codes, MICR, print data matrix, and two-dimensional codes.

Further, the system 10 enables the production of a piece-by-piece audit trail of every envelope leaving a feeder device, providing confidence that every piece printed was mailed out. When a document is unreadable, out of order, or missing altogether, the system 10 will instantly stop a feeder device and point an operator to the problem, allowing them to correct mistakes as they happen.

As well, the system 10 is highly interoperable with multiple machine manufactures and new or legacy equipment, adding improved quality control and integrity checking to print and mail operations. The system 10 enables operators to run their inserters and other feeder equipment at full speed. The system 10 enables cross-referencing to a master list to ensure that what is thought to have been printed and packaged is what was actually done.

A quality assurance report can be printed at any time that identifies every envelope the system 10 has seen, and often more importantly every envelope it hasn't seen. This eliminates any need to guess what needs to be reprinted, therein providing a higher quality output at a lower cost, whether matching on an inserter or checking text on a web press. The system 10 is ultimately more tolerant of poor setup, easier to use, requires less operator training to get good results, dramatically improves accuracy, and requires fewer service calls.

Any hardware, software or a combination of hardware and software having the above-described functions may implement the feeder control system 10 and 100 method according to the present teachings, and methods described above. The software code, either in its entirety or a part thereof, may be in the form of a computer program product such as a computer-readable memory having the system and/or method stored therein.

Furthermore, a computer data signal representation of that software code may be embedded in a carrier wave for transmission via communications network infrastructure. Such a computer program product and a computer data signal are also within the scope of the present invention, as well as the hardware, software and combination thereof.

Although the present teachings have been described in considerable detail with reference to certain preferred embodiments thereof, other versions are possible. Therefore, the spirit and scope of the appended claims should not be limited to the description of the preferred embodiments contained herein.

What is claimed is:

1. A computer-implemented method of processing a plurality mail pieces, the method comprising steps of:
    extracting read comparison data from a print stream database;
    storing the extracted read comparison data for access by document handling equipment for processing the plurality of mail pieces;
    processing the plurality of mail pieces on the document handling equipment to at least obtain unique mail piece information using a line scan camera from each respective mail piece;
    performing integrity verification by matching the extracted read comparison data with the read unique mail piece information for each respective mail piece;
    determining, based on the performed integrity verification, whether any one of the mail pieces is processed out of sequential order or other print discrepancy that the document handling equipment encounters in the unique mail piece information when it is compared to the extracted read comparison data of any one of the processed mail pieces such that corrective action can be taken; and
    generating an electronically accessible report containing mail piece sequence information for each of the respective mailpieces processed by the document processing equipment and/or print discrepancy data for each of the respective mailpieces.

2. The method according to claim 1, further comprising the step of:
    in the event of an unsuccessful verification, stopping the processing of the mail pieces on the document handling equipment and taking corrective action.

3. The method according to claim 1, wherein the document processing handling includes an inserter, printing press or bookmaker.

4. The method according to claim 1, further comprising the step of:
    storing an obtained address information together with the extracted read comparison data at a networked location.

* * * * *